US006378303B1

(12) United States Patent
Higuchi et al.

(10) Patent No.: US 6,378,303 B1
(45) Date of Patent: Apr. 30, 2002

(54) HYDRAULIC CONTROL DEVICE OF A WORKING MACHINE

(75) Inventors: Fumikazu Higuchi; Yutaka Tohji; Kazuharu Tajima, all of Hiroshima (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/521,120

(22) Filed: Mar. 7, 2000

Related U.S. Application Data

(63) Continuation of application No. PCT/JP99/03636, filed on Jul. 6, 1999.

(30) Foreign Application Priority Data

Jul. 7, 1998 (JP) .......................................... 10-191414
Sep. 29, 1998 (JP) .......................................... 10-292950
Jun. 25, 1999 (JP) .......................................... 11-180654

(51) Int. Cl.[7] ............................................ F16D 31/02
(52) U.S. Cl. ............................................ 60/468
(58) Field of Search ............................................ 60/468

(56) References Cited

U.S. PATENT DOCUMENTS 5,680,760 A * 10/1997 Lunzman ..................... 60/468

FOREIGN PATENT DOCUMENTS

| | | |
|---|---|---|
| JP | 3-73703 | 7/1991 |
| JP | 05156668 | 6/1993 |
| JP | 05346101 | 12/1993 |
| JP | 0612803 | 2/1994 |
| JP | 09165791 | 6/1997 |
| JP | 10-18359 | 1/1998 |
| JP | 1061605 | 3/1998 |
| JP | 10-147959 | 6/1998 |
| JP | 10-204926 | 8/1998 |

* cited by examiner

*Primary Examiner*—F. Daniel Lopez
(74) *Attorney, Agent, or Firm*—Oblon, Spivak, McClelland, Maier & Neustadt, P.C.

(57) ABSTRACT

A hydraulic control apparatus for a working machine in which a flow rate and a direction of pressure oil discharged from a hydraulic pump are controlled by a control valve to supply it to a swing motor, comprising: a bleed-off oil path for bleeding off a part of the pressure oil supplied to the swing motor, a cut valve provided on the bleed-off oil path to adjust a bleed-off amount, a controller for controlling the cut valve through a solenoid proportional valve, and pressure sensors for detecting an operating amount of a remote control valve for swing, characterized in that the controller sets the bleed-off amount according to the operating amount detected by the pressure sensors, controls an opening area of the cut valve on the basis of the bleed-off amount set, and suppresses the shock when sudden swinging operation takes place.

11 Claims, 9 Drawing Sheets

HYDRAULIC CONTROL DEVICE OF A WORKING MACHINE

This application is a continuation of International application No. PCT/JP99/03636 filed on Jul. 6, 1999.

BACKGROUND OF THE INVENTION

1. Field of the Invention

The present invention relates to a hydraulic control device of controlling an actuator provided on a working machine such as a hydraulic excavator, and particularly to a hydraulic control device of a working machine suitable for controlling a swinging operation.

2. Description of the Related Art

Conventionally, in the hydraulic excavator as the working machine, when attachments such as a swing motor, a travel motor, a boom cylinder, an arm cylinder, a bucket cylinder and so on are operated, an operating lever is operated to a full lever at a stretch, a lever operating amount is held constant, or the operating amount is somewhat changed while operating the actuator in a constant amount.

When the response of the actuator to the lever operation is excessively sensitive, there involves inconveniences such that when in operation, the actuator is actuated with the shock; it is difficult to hold the lever operating amount constant; or when the lever operation is changed in slight amount, the actuator sensitively reacts therewith to bring forth hunting. It is difficult for an unskilled operator to handle such a sensitively operating actuator as described. Then, an attempt has been made wherein a bleed-off passage of a control valve designed so that when the full lever operation is made, it is normally fully closed is made in a slightly open state even at the full lever operation, thereby improving the operativeness.

For example, in Japanese Patent Application Laid-Open No. 9-165791 Publication, there is shown a constitution in which in the full lever operation, a predetermined flow rate is discharged to a tank from a hydraulic pump, as shown in FIG. 10. In FIG. 10, reference numeral 60 designates an engine; 61 and 62 a first hydraulic pump and a second hydraulic pump driven by the engine 60; 63 a cylinder for an earth-discharge plate; 64 a swing motor; 65 an arm cylinder; 66 a left travel motor; 67 a bucket cylinder; 68 a swing cylinder; 69 a boom cylinder; and 70 a right travel motor. Direction control valves are disposed on a center bypass line 71 connected to the first hydraulic pump 61, and a direction control valve 73 for an arm is connected in tandem at the downstream side of a direction control valve 72 for swing. The direction control valve 72 for swing is provided with a throttle 72*a* forming a bleed-off opening.

According to this constitution, in the full lever operation, the direction control valve 72 for swing bleeds off a part of pressure oil, and where single driving of the swing motor 64 is switched to composite driving of the swing motor 64 and the arm cylinder 65, the flow rate discharged from the throttle 72*a* is supplied to the arm cylinder 65 through a direction control valve 73 for an arm positioned at the downstream of the direction control valve 72 for swing. At this time, the flow rate substantially equal to that at the swing single driving is supplied to the swing motor 64. Accordingly, it is possible to prevent rapid swing operation in the swing single driving, and in the composite driving, it is possible to prevent the swing speed from being lowered rapidly.

However, since in the aforementioned conventional hydraulic circuit, the bleed-off passage (the throttle 72*a*) is in a normally open state, when the engine is increased in rotation to discharge a predetermined flow rate of pressure oil from the first hydraulic pump 61, no problem occurs, but since a predetermined flow rate of pressure oil is subject to the bleeding-off, when the rotational frequency of the engine lowers, the flow rate flowing into the swing motor 64 reduces, so that the swing speed lowers.

The concrete work is taken as an example and explained. Where the swing work is carried out on the inclined ground and where an upper swing body is swung toward the upper side of the inclined surface, load applied to the swing motor 54 increases. When the bleed-off passage (the throttle 72*a*) is opened, the bleed-off flow rate discharged from the bleed-off passage naturally increases, so that the swing speed lowers. Moreover, normally, in the inclined ground, an operator lowers the rotational frequency of the engine for operation in consideration of the stability of the hydraulic excavator. Accordingly, under the conditions as described, it is sometimes that pressure oil necessary for swinging is not sufficiently supplied to the swing motor 64 to stop the swing operation.

SUMMARY OF THE INVENTION

A first object of the present invention is to provide a hydraulic control device of a hydraulic working machine, in which for example, in a swing operation, even if full lever operation is carried out, no shock caused by rapid swinging occurs, and a second object thereof is to provide said device, in which for example, in a swing operation, even if the rotational frequency of the engine is lowered, the flow rate necessary for swinging can be supplied to a swing motor to carry out a stable swing operation.

The present invention relates to a hydraulic control device of a working machine having a hydraulic pump driven by a power source, an actuator operated by pressure oil discharged from the hydraulic pump, a control valve for controlling a flow rate and a direction of the pressure oil discharged from the hydraulic pump, and an operating member for switching and operating the control valve, said hydraulic control device of a working machine comprising a bleed-off oil path for bleeding off a part of pressure oil supplied to a specific actuator out of the actuator, a bleed-off amount adjusting means for adjusting a bleed-off amount provided in the bleed-off oil path, an operating amount detecting means for detecting an operating amount of the operating member, and a control means for setting a bleed-off amount according to the operating amount detected by the operating amount detecting means and controlling the bleed-off amount set.

The bleed-off oil path can be constituted by a bypass oil path for communication between an upstream side of the oil path and a downstream side of the oil path of the control valve connected to the specific actuator.

Further, the control valve connected to the specific actuator can be formed with a meter-in passage, a meter-out passage, and said bleed-off oil path as a third passage.

Further, the bleed-off oil path can be constituted by a branch path branched from an oil path which connects the hydraulic pump and the control valve connected the specific actuator.

Further, the bleed-of amount adjusting means can be constituted specifically by a pilot switching valve for opening and closing the bleed-off oil path, and a solenoid proportional valve for exerting a pilot pressure according to the set bleed-off amount on the pilot switching valve.

The control means according to the present invention is possible to control the bleed-off amount adjusting means so that the bleed-off oil path is closed according to the operating amount of the operating member, and when the operating amount reaches a full stroke, the bleed-off oil path is not fully closed.

In the present invention provided with the bypass oil path, if the control valve connected to the specific actuator is designed to intercept the center bypass at the time of switching operation, the control means can be constituted such that the bypass oil path is switched from a full open position to a full closed position with delay for a predetermined time when switching operation is carried out. Further, the control means can be designed so that when the operating amount of the operating member exceeds a first set operating amount, the bypass oil path is gradually closed with delay of time, and when the operating amount of the operating member lowers than a second set operating amount, the closed bypass oil path is released.

In the present invention, where the rotational frequency detecting means for detecting rotational frequency of the power source is present, the control means is possible to control so that when the detected value of the rotational frequency detecting means lowers than a predetermined rotational frequency, the bleed-off oil path is closed.

The control means in the present invention selects a higher degree between the bleed-off amount based on the operating amount detected by the operating amount detecting means and the bleed-off amount based n the rotational frequency detected by the rotational frequency detecting means and control the bleed-off amount adjusting means with the selected bleed-off amount. Further, the control means can control the bleed-off amount adjusting means so that as the rotational frequency of the power source, the bleed-of amount is reduced.

In the present invention, as a concrete example of the specific actuator, a swing motor is shown, and as a control valve connected to the specific actuator, a control valve for swing is shown.

In accordance with the present invention, when the operating member is fully operated, the bleed-off amount adjusting means opens the bleed-off oil path, and bleed-off a part of pressure oil supplied to the specific actuator.

In accordance with the present invention provided with the bypass oil path, when the bleed-off amount adjusting means or the control means fails so that the bleed-off oil path is closed, the pressure oil does not flow into the bypass oil path but the pressure oil flows into the control valve connected to the specific actuator, whereby the specific actuator can be operated continuously. Even in the severe environment for the mechatrosystem working machine involving high temperature, much humidity or much dust, the working machine can be operated stably.

In accordance with the present invention provided with the bleed-off oil path in the control valve, since a part of pressure oil is bled off from the bleed-off oil path formed in the control valve connected to the specific actuator, the circuit constitution is simple.

In accordance with the present invention provided with the branch path at the upstream side of the control valve, since a part of pressure oil supplied to the control valve connected to the specific actuator is bled off on this side of the control valve, the circuit constitution is simple.

In accordance with the present invention in which the bleed-off amount adjusting means comprises a pilot switching valve and a solenoid proportional valve, it is possible to adjust the flow rate of pressure oil flowing in the bleed-off oil path following the operating amount of the operating member.

In accordance with the present invention, when the operating amount of the operating member reaches a full stroke, the bleed-off oil path is not fully closed, whereby the shock caused by the sudden operation can be suppressed.

In accordance with the present invention in which the bypass oil path is closed with delay of time, even if the operating member is operated, the actuator is actuated with delay of predetermined time, whereby the shock caused by the sudden operation can be suppressed.

In accordance with the present invention provided with the rotational frequency detecting means, when the rotational frequency of the engine lowers in a predetermined rotational frequency, the bleed-off oil path is closed, and pressure oil in amount necessary for operation of the actuator is supplied.

In accordance with the present invention in which the rotational frequency of the engine is detected, the bleed-off amount based on the operating amount and the bleed-off amount based on the rotational amount of the engine are selected in high degree, and the bleed-off amount adjusting means is controlled on the basis of the selected bleed-off amount.

Further, since the bleed-off amount can be lowered as the rotational frequency of the engine lowers, the actuator can be operated stably.

In accordance with the present invention in which the specific actuator comprises a swing motor, if the swing operation is carried out suddenly, the shock is suppressed, and other actuators are not affected in operation.

DESCRIPTION OF PREFERRED EMBODIMENTS

Figure 1:
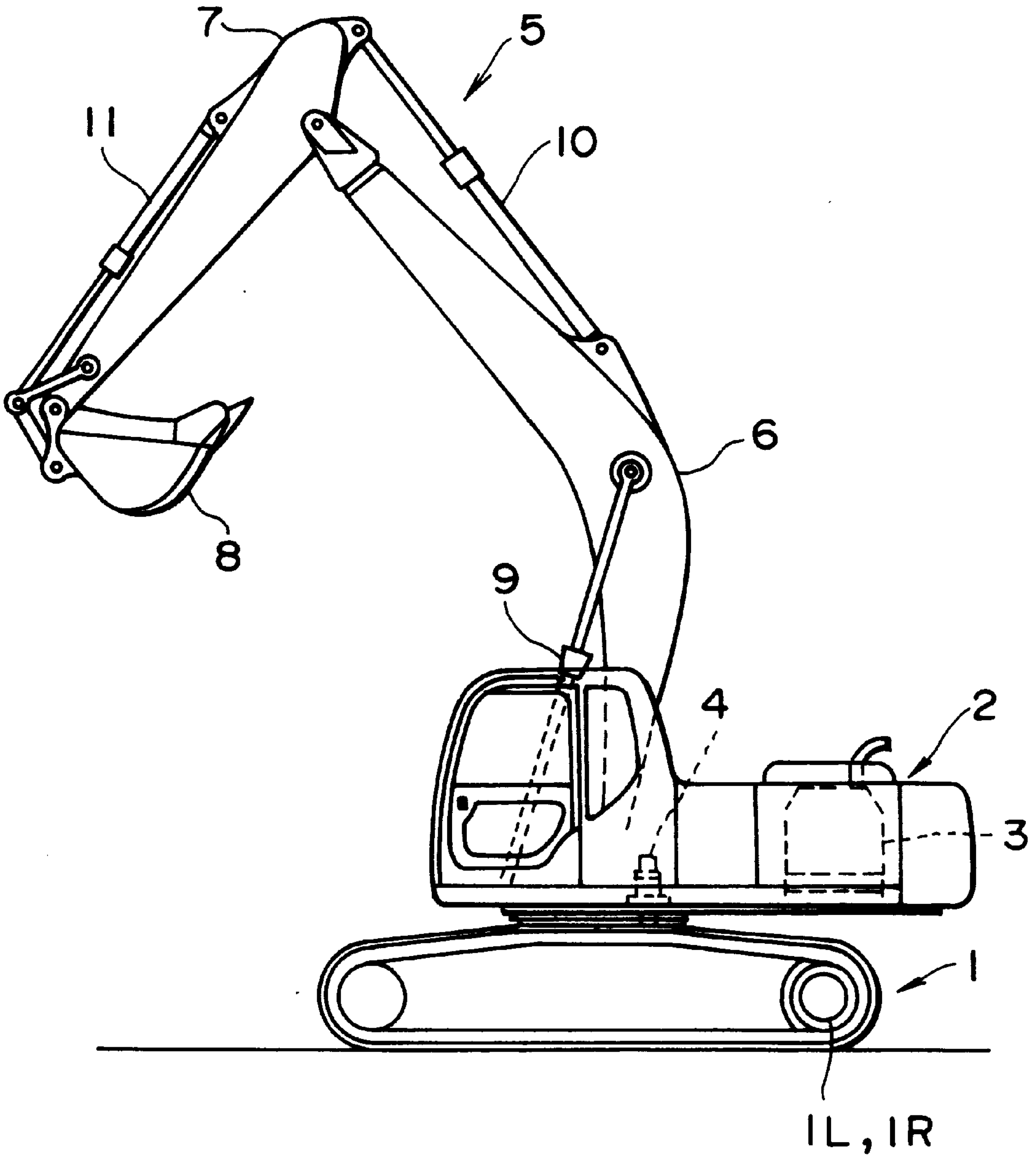
FIG. 1 is a side view of a hydraulic excavator provided with a hydraulic control apparatus according to the present invention.

FIG. 1 shows a side view of a working machine provided with a hydraulic control device according to the present invention, concretely, a hydraulic excavator. In FIG. 1, reference numeral 1 denotes a lower travel body of the hydraulic excavator; 1L, 1R a pair of left and right travel driving travel motors; 2 an upper swing body mounted for swing on the lower travel body 1; 3 an engine as a power source provided on the upper swing body 2; 4 a swing motor for swinging the upper swing body 2; 5 a work attachment provided for rising and falling on the upper swing body 2; 6 a boom for the work attachment 5; 7 an arm connected for vertical rocking to an extreme end of the arm 6; and 8 a bucket as a working tool mounted on an extreme end of the arm 7. Numerals 9, 10 and 11 denote a boom cylinder, an arm cylinder and a bucket cylinder, respectively, as hydraulic actuators for driving the work attachment 5.

Figure 2:
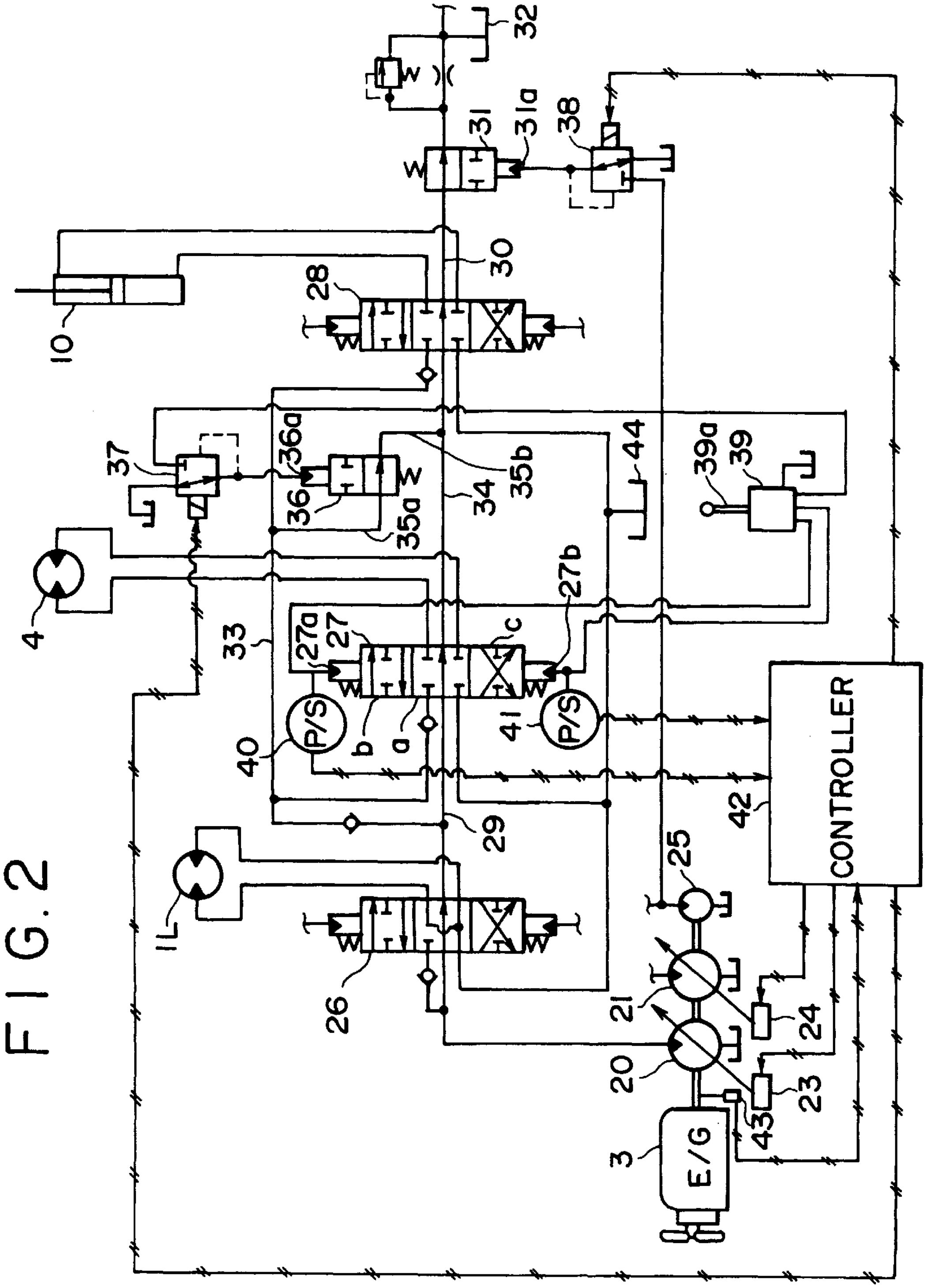
FIG. 2 is a main part hydraulic circuit showing a first embodiment of a hydraulic control apparatus according to the present invention.
Figure 3:
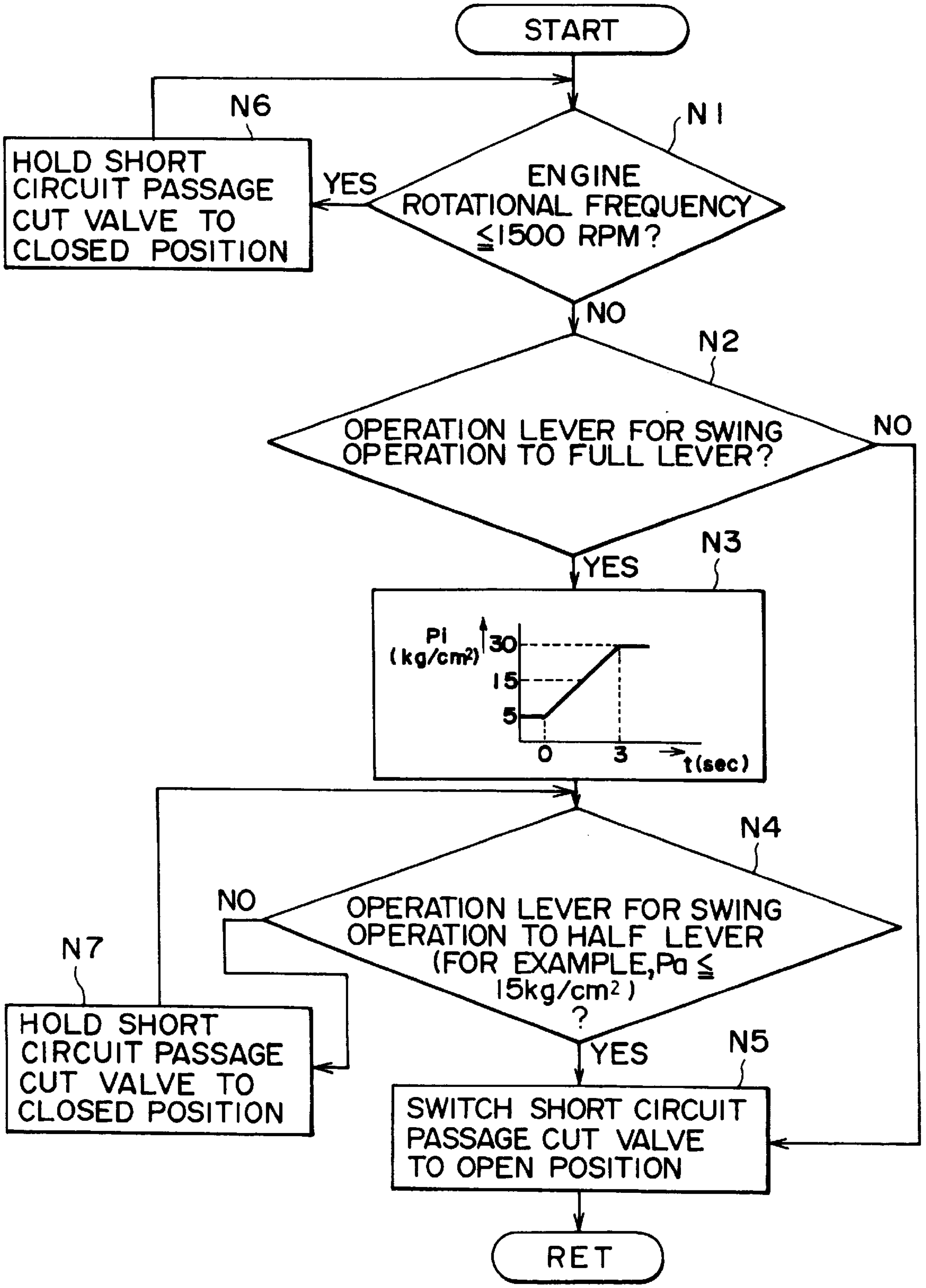
FIG. 3 is a flowchart showing operation of the hydraulic control apparatus shown in FIG. 2.
Figure 4:
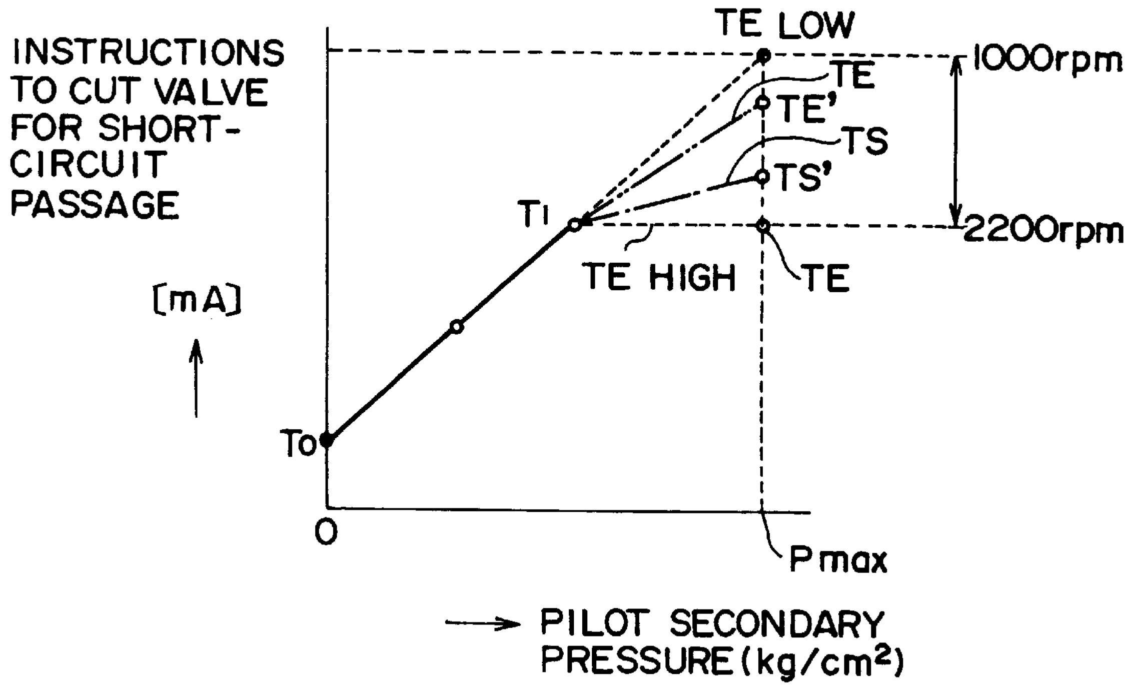
FIG. 4 is a graph showing cut-valve instructions by a controller shown in FIG. 2.

FIGS. 2 to 4 show a first embodiment of a hydraulic control device provided on the hydraulic excavator shown in FIG. 1. In FIG. 2, reference numerals 20, 21 denote first and second hydraulic pumps for discharging main pressure oil driven by the engine 3, and 23, 24 denote regulators for adjusting a slant-plate tilting amount of the hydraulic pumps 20, 21.

Reference numeral 25 denotes a pilot pump; 26 a control valve for travel for controlling the travel motor 1L; 27 a control valve for swing (a control valve connected to a specific actuator) for controlling the swing motor (a specific actuator) 4; 28 a control valve for arm for controlling the arm cylinder 10; and 29 a center bypass oil path for flowing pressure oil from the first hydraulic pump 20 passing through neutral positions of the control valves 26, 27 and 28, respectively.

Reference numeral 30 denotes an outlet side flowpassage of the center bypass oil path 29; and 31 a cut valve for return oil provided in the outlet side flowpassage 30 to pass or cut-off return oil to an oil tank 32. Reference numeral 33 denotes an upstream side supply oil path for supplying pressure oil from the hydraulic pump 20 to the control valve for swing 27 and the control valve for arm 28 from the upstream side of the oil path, and 34 a downstream side center bypass oil path at the downstream side of the control valve for swing 27 of the center bypass oil path 29. Reference numerals 35*a* to 35*b* denote bypass oil paths for short circuit for communication between the upstream side supply oil path 33 and the downstream side center bypass oil path 34, and 36 a cut valve for short circuit passage (a pilot switching valve) disposed in the bypass oil paths for short circuit 35*a*–35*b*.

Reference numeral 37 denotes a solenoid proportional valve for supplying a pilot pressure to a pilot port 36*a* of the cut valve for shirt circuit 36, and 38 a solenoid proportional valve for supplying a pilot pressure to a pilot port 31*a* of the cut valve for return oil 31.

Reference numeral 39*a* denotes an operating lever directly connected to a remote control valve for swing 39, which lever is to operate the swing motor 4. Reference numerals 40, 41 denote pressure sensors (operating amount detecting means) for detecting an operating amount of the operating lever 39*a,* which pressure sensors are to detect pilot secondary pressures output from the remote control valve for swing 39 and introduced into both pilot ports 27*a,* 27*b* of the control valve for swing 27.

The secondary pilot pressures detected are applied to a controller (a control means) 42. A rotational frequency sensor (a rotational frequency detecting means) 43 for detecting rotational frequency of the engine 3 is connected to the controller 42.

The operation of the hydraulic control device as constructed above will be explained hereinafter. The control of the controller 42 has first to third modes.

1. First Control Mode

When in the swing operation, the operating lever 39*a* is operated, the control valve for swing 27 is switched from a neutral position a to a position b or a position c to cut-off the center bypass, so that pressure oil discharged from the first hydraulic pump 20 is supplied to the swing motor 4 through the control valve for swing 27.

Operating pressures when the operating lever 39*a* is operated is detected by the pressure sensors 40, 41 and applied to the controller 42. Accordingly, the controller 42 applies a flow rate control signal according to the operating amount to the solenoid proportional valve 37, and controls the cut valve 36 for short circuit passage by control pressure output from the solenoid proportional valve 37 to adjust the flow rate of pressure oil passing through the bypass oil paths for short circuit 35*a*–35*b*.

The cut valve for short circuit passage 36 is fully opened in the state where the operating lever 39*a* is not operated, and the controller 42 reduces an opening degree gradually in proportion to the operating amount of the operating lever 39*a*. The controller 42 controls the solenoid proportional valve 37 and the cut valve for short circuit passage 36 so that in the state where the operating lever 39*a* is subjected to full lever operation, the bypass oil paths for short circuit 35*a*–35*b* are not fully closed.

According to the above-described control method, there assumes substantially the same state as that in the full lever operation of the operating lever 39*a,* the control valve for swing 27 is bled off. Accordingly, even if the operating lever 39*a* is suddenly operated, no shock occurs.

Further, in the circuit constitution shown in FIG. 2, even the bypass oil paths for short circuit 35*a*–35*b* remain closed due to troubles of the cut valve for short circuit passage 36, the solenoid proportional valve 37 or the controller 42, the bleed-off passage of the control valve for swing 27 merely assumes a fully closed state, and though the operativeness is over-sensitive, the swinging operation can be accomplished. Accordingly, the operation can be continued during the waiting of repairs. Moreover, there is a further advantage that the operations of other actuators, for example, the arm cylinder 10, are not affected.

2. Second Control Mode

The controller 42 in the second control mode is to have a delay of operation in preventing the shock in the sudden operation. For example, the cut valve for short circuit 36 and the solenoid proportional valve 37 are controlled so that after the center bypass passage of the control valve for swing 27 is fully closed, the bypass passages 35*a*–35*b* are closed with a delay of predetermined time (for example, for a few seconds). According to this control mode, it is possible to obtain sufficient working speed and operating force in order to close the cut valve for short circuit 36 after passage of predetermined time so as to avoid the bleed-off while relieving the shock caused by the rapid operation of the swing motor 4. In making a delay of predetermined time, the passages of the bypass oil paths for short circuit 35*a*–35*b* are closed while gradually drawing them to thereby enable exhibition of the shock relieving function in sudden operation effectively.

3. Third Control Mode

The controller 42 in the third control mode receives rotational frequency of the engine detected from the rotational frequency sensor 43, and when it is lower than the predetermined rotational frequency of the engine, controls the cut valve for short circuit passage 36 and the solenoid proportional valve 37 so as to close the bypass passages for short circuit 35*a*–36*a*.

Where the swinging work is carried out in the inclined ground, when the upper swing body is swung toward the upper side of the inclined surface, a load applied to the swing motor 4 becomes heavy. At that time, when the cut valve for short circuit 36 is open, a part of pressure oil is bled off through the bypass oil paths for short circuit 35*a*–35*b* so that the swing speed lowers. In the inclined ground, an operator normally lowers the rotational frequency of the engine in consideration of possible falling down of the hydraulic excavator. Thereby, it is sometimes that a supply of pressure oil to the swing motor 4 is short so that the swing operation stops.

Then, according to the third control mode, where the rotational frequency of the engine 3 is low, the flow rate necessary for the swing operation is supplied to the swing motor 4 so that the swing motor 4 may be operated stably. On the other hand, where the rotational frequency of the engine 3 is high, and the operating amount of the operating lever 39*a* is large, the bypass oil paths for short circuit 35*a*–35*b* are not completely closed to bleed off pressure oil, thus making it possible to relieve the shock in operation.

FIG. 3 is a flowchart showing the above-described third control mode.

In FIG. 3, the controller 42, first, judges if the engine rotational frequency is low, concretely, less than 1,500 rpm (Step N1), and if NO, judges if the operating lever 39*a* for swing is subjected to full lever operation (Step N2). The full lever operation judges if the pilot secondary pressure Pa output from the pressure sensor 40 or 41 exceeds, for example, 30 kg/cm$^2$.

In Step N1, where the full lever operation is effected, the cut valve for short circuit 36 is controlled in accordance with the control pressure characteristic of Step N3. More specifically, when the operating lever 39*a* is in a neutral position, the control pressure P1 is held at 5 kg/cm$^2$; and the control pressure Pi gradually increases from the operation start time of the operating lever 39*a,* reaches 30 kg/cm$^2$ after passage of 3 seconds, and holds 30 kg/cm$^2$ by the full lever operation.

When operation is made with the operating amount of the operating lever 39*a* exceeding a first set operating amount (for example, Pa=30 kg/cm$^2$), the control pressure, Pi is increased gradually by taking the 3 seconds which is the predetermined time, to close the bypass oil paths for short circuit 35*a*–35*b,* whereas when the operating amount of the operating lever 39*a* lowers than a second set operating amount (for example, Pa=15 kg/cm$^2$) (Step N4), the control pressure Pi is lowered gradually, after which for example, control pressure Pi=5 kg/cm$^2$ is held to release the closed state of the bypass oil paths for short circuit 35*a*–35*b* (Step N5).

In Step N1, if YES, the control pressure Pi with respect to the cut valve for short circuit 36 is held constant at, for example, 30 kg/cm$^2$ to hold it at a closed position (Step No. 6). In Step N4, if NO, the control pressure Pi with respect to the cut valve for short circuit 36 is likewise held constant at, for example, 30 kg/cm$^2$ to hold it at a closed position (Step No. 7).

According to this control, even if the operating lever 39*a* is subjected to full lever operation suddenly, no shock occurs in the operation of the swing motor and the bypass oil paths for short circuit 35*a*–35*b* are closed after passage of a predetermined time, because of which the swing motor 4 can obtain a sufficient swing speed. Thereafter, where operation requiring accuracy is carried out, the operating amount of the operating lever 39*a* lowers than the second set operating amount, so that the bypass oil paths for short circuit 35*a*–35*b* are closed and a shockless smooth operating feeling can be obtained.

While in the hydraulic control device shown in FIG. 2, the bleed off amount adjusting means for controlling the flow rate of pressure oil passing through the bypass oil paths for short circuit 35*a*–35*b* is composed of the cut valve for short circuit passage 36 and the solenoid proportional valve 37, it is to be noted that the device is not limited thereto, but if the bypass oil paths for short circuit 35*a*–35*b* can be opened when the operating amount by the operating lever 39*a* exceeds a predetermined operating amount, it can be composed merely of an solenoid switching valve.

FIG. 4 shows another control example which controls the cut valve for short circuit passage 36 by changing to the control pressure characteristic shown in Step N3 in FIG. 3.

In the graph of FIG. 4, a constitution in which when the engine rotational frequency is lowered, the bypass oil paths for short circuit 35*a*–35*b* are closed is the same as the control content described above, but the controller 42 in this case adjust an opening degree of the cut valve for short circuit passage 36 by comparing (1) a bleed off opening surface (hereinafter called an operating amount opening area) of the cut valve for short circuit passage 36 determined by the operating amount of the operating lever for swing 39*a* with (2) a bleed off opening area (hereinafter called a rotational frequency opening area) determined by the engine rotational frequency), and selecting one which is smaller in opening area so as to have the selected opening area.

More specifically, when the rotational frequency opening area characteristic TE changes from TE high to TE low in a range, for example, from high idle (2,200 rpm) to low idle (1,000 rpm), TE<TS results at the full lever time (Pmax) in the full idle, and TS is selected in high level and is output as the instructions value to the cut valve for short circuit passage 36. However, when the engine rotational frequency lowers to TE', TE'>TS results, in which case TE' is selected in high level and is output as the instructions value to the cut valve for short circuit passage 36. Here, a rising portion ($To \rightarrow T_1$) in each opening area characteristic is a common characteristic.

If the opening areas are always compared as described above, and the cut valve for short circuit passage 36 is controlled by section of high level, even in the case where work is carried out with the engine rotational frequency made low, there provides an advantage that speed and pressure to a certain degree can be secured for an actuator.

Figure 5:
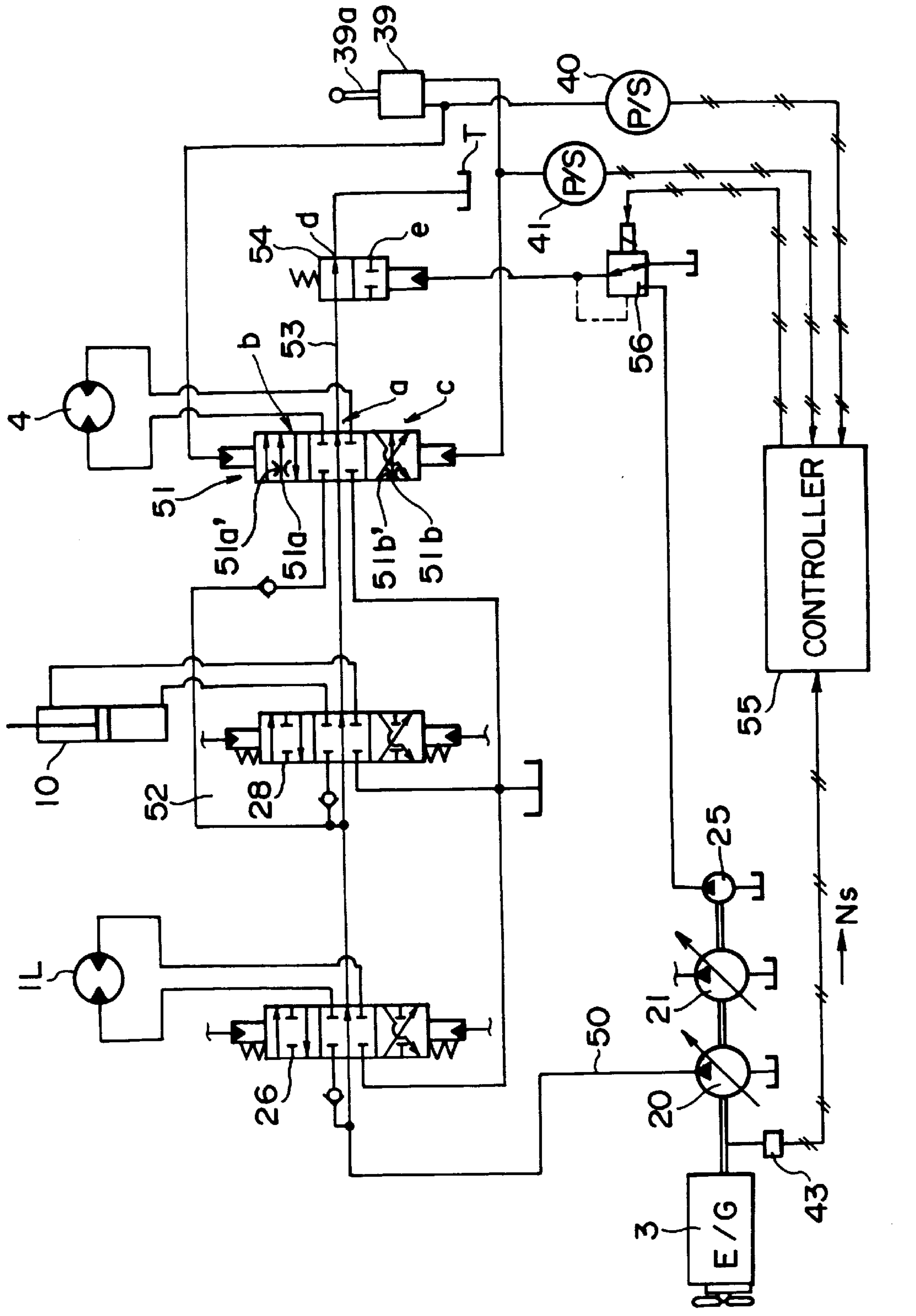
FIG. 5 is a main part hydraulic circuit showing a second embodiment of a hydraulic control apparatus according to the present invention.

FIG. 5 shows a second embodiment of the hydraulic control device according to the present invention. In the following drawing, the same constituent elements as those shown in FIG. 2 are indicated by the same reference numerals, description of which will be omitted. For simplifying the description, a circuit for singly operating a swing motor is shown.

In FIG. 5, the pressure oil discharged from the first hydraulic pump 20 flows into the working oil tank T through the center bypass line 50, and to the center bypass line 50 are connected the control valve for travel 26, the control valve for arm 28, and the control valve for swing (a control valve connected to a specific actuator) 51.

The control valve for arm 28 is connected in tandem to the downstream of the control valve for travel 26, and the control valve for arm 28 and the control valve for swing 51 are connected in parallel through a pipe line 52.

The control valve for swing 51 has three passages, i.e., a meter-in, a meter-out, and a bleed-off (in a neutral position, a center bypass) provided in a single spool, so that even at the full lever operation time, the bleed off passage is held at a predetermined opening degree and is not fully closed.

More specifically, with respect to the lever position/opening area characteristic of he control valve for swing 51, at the neutral position a, the meter-in and meter-out are minimum, and the bleed off opening area is maximum. As the operating amount of the operating lever increases (b or c position) both opening areas of the meter-in and meter-out increase while the bleed off opening area reduces, but even at the full lever time, they are not completely closed but the bleed off passages 51*a* and 51*b* are held at a predetermined opening degree. That is, the constant bleed off flow rate is secured by the throttle 51*a'* or 51*b'*.

To an outlet side of the bleed off passage of the control valve for swing 51 is connected a bleed off oil path 53 for bypassing a part of the flow rate toward the swing motor 4 to the tank T, and the bleed off oil path 53 is provided with a cut valve (a pilot switching valve) 54. The cut valve 54 has a fully open position d and a fully closed position e, which is switched by pilot pressure introduced from a solenoid proportional valve 56 controlled by a controller 55. Accordingly, the bleed off flow rate at that time is to be determined by the sum total of an opening area of the throttle 51*a'* or 51*b'* of the control valve for swing 51, and an opening are of the cut valve 54. The throttle 51*a'* (or 51*b'*) and the cut valve 54 function as the bleed off amount adjusting means.

Pilot pressures introduced into both pilot ports of the control valve for swing 51 are detected by the pressure sensors 40 and 41, respectively and applied to the controller 55. The rotational frequency of the engine 24 is detected by the rotational frequency sensor (rotational frequency detecting means) 43 and likewise applied to the controller 55.

Figure 6:
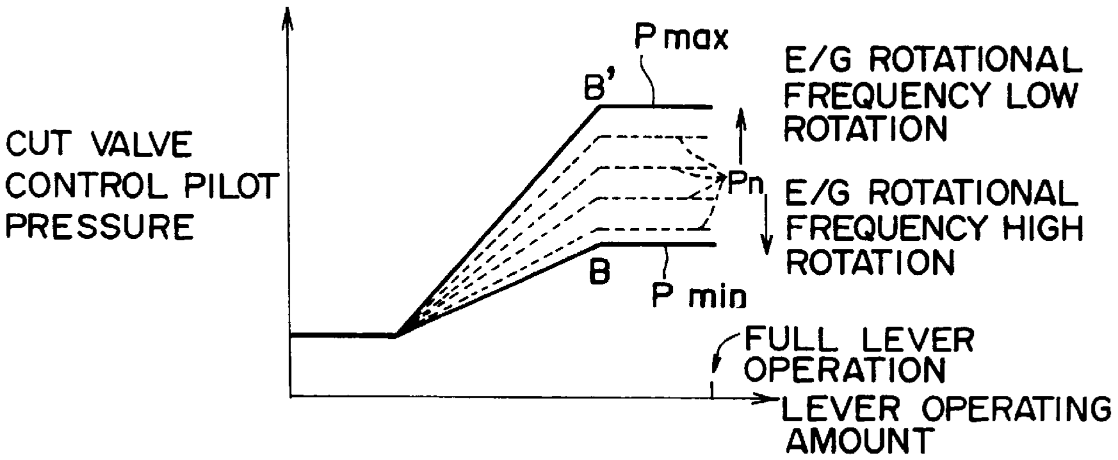
FIG. 6 is a graph showing cut valve instructions by a controller shown in FIG. 5.

The controller 55, as shown in FIG. 6, increases the cut valve control pilot pressure as the operating amount of the operating lever 39*a* increases to carry out the valve closing control, but executes a plurality of patterns of the valve closing control according to the engine rotational frequency when operated.

For example, where the engine 3 driven, for example, in a range from 800 to 2,000 rpm, the controller 55 selects the control pattern Pmax on the low rotation side (for example, 1,000 rpm) and selects the control pattern Pmin on the high rotation side (for example, 1,800 rpm), and in the range of Pmin to Pmax (B point to B' point in the cut valve control pilot pressure), either control pattern out of Pn is selected according to the engine rotational frequency Ns.

Figure 7:
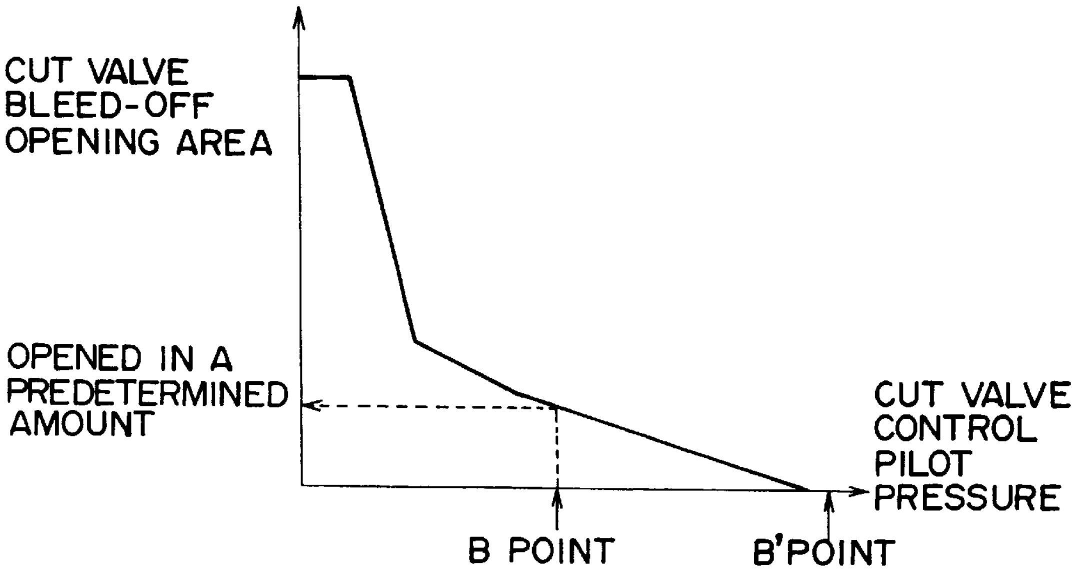
FIG. 7 is a graph showing an opening area characteristic of the cut-valve shown in FIG. 5.

On the other hand, in the cut valve 54, as shown in FIG. 7, as the cut valve control pilot pressure increase, the bleed off opening area reduces, and when cut valve control pilot pressure at the B point, it is in a state where a predetermined amount thereof is opened, and at the B' point, being completely closed. That is, where the engine 3 is driven at the high rotation, the cut valve control pilot pressure merely rises to the B point and accordingly the cut valve 54 holds a predetermined opening degree. However, as the engine rotational frequency Ns lowers, the cut valve control pilot pressure rises, coming closer to the B' point from the B point. As the result, the bleed off opening area of the cut valve reduces gradually. It is to be noted that the cut valve control pilot pressure characteristic between the B point and B' point is not limited to linearity shown in the present embodiment but can be non-linearity, for example, such as a hyperbola.

Next, the operation of the hydraulic control device shown in FIG. 5 will be described.

In the swinging operation, when the operating lever 39*a* is operated, the pressure oil discharged from the first hydraulic pump 29 is supplied to the swing motor 4 through the control valve for swing 51. At this time, the swing speed is determined by the flow rate supplied to the swing motor 4, but a part of the pressure oil discharged from the first hydraulic pump 20 is discharged to the tank T through the bleed off passage 51*a* (or 51*b*) of the control valve for swing 51, the bleed off pipeline 53 and the cut valve 54.

Accordingly, since in this state, in the driving of the swing motor 4, a part of the pressure oil is bled off, it is possible to suppress the shock caused by sudden operation of the operating lever 39*a*.

In the swinging operation, for example, when the hydraulic excavator is in an inclined attitude on the inclined surface, an operator sometimes lowers the engine rotational frequency for the sake of safety.

In this case, since the lowering of the engine rotational frequency Ns is detected by the rotational frequency sensor 43, the controller 55 selects the cut valve control pilot pressure pattern corresponding to the engine rotational frequency Ns from the cut valve control pilot pressure shown in FIG. 6, and controls the cut valve 54 in accordance with the selected pattern.

That is, when the engine rotational frequency Ns is in a low rotational zone, for example, less than 1,000 rpm, the controller 55 selects the control pattern Pmax to output the maximum cut valve control pilot pressure B' to the cut valve 54. Thereby, the cut valve 54 is closed (see the cut valve bleed off opening area in FIG. 7), the bleed off pipeline 53 is cut off, and the bleed off from the bleed off passage 51*a* or 51*b* of the control valve for swing 51 stops.

Thereby, all the pressure oil discharged from the first hydraulic pump 20 is supplied to the swing motor 4 without loss from the bleed off passage 51*a* or 51*b*. Accordingly, even if the engine rotational frequency is lowered, the pressure oil necessary for swing can be supplied to the swing motor 4, thus making it possible to overcome inconveniences that when swinging is carried out at low speed, the swinging operation stops.

While in the hydraulic control device shown in FIG. 5, even if the cut valve 54 is not closed, the bleed off flow rate is controlled to some extent by the throttle 51*a'* or 51*b'* provided on the bleed off passage 51*a* or 51*b* of the control valve for swing 51, there is an advantage that the swinging work can be carried out safely.

Figure 8:
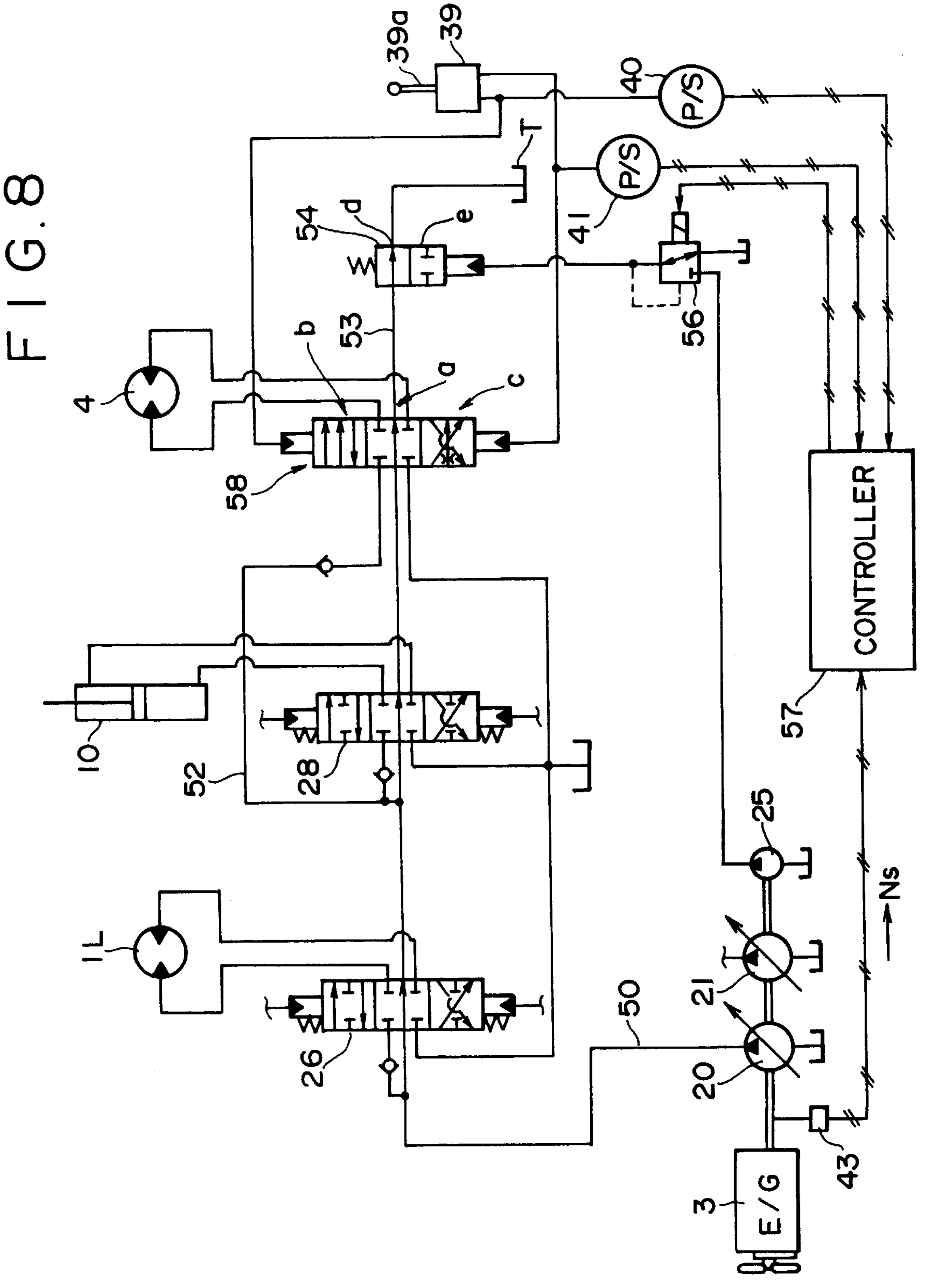
FIG. 8 is a main part hydraulic circuit showing a third embodiment of a hydraulic control apparatus according to the present invention.

FIG. 8 shows a third embodiment of the hydraulic control device according to the present invention.

In the hydraulic circuit shown in FIG. 8, a control valve for swing 58 is provided with passages for a meter-in, a meter-out and a bleed off, but this circuit is different from the circuit constitution shown in FIG. 5 in that the control of the bleed off flow rate is exclusively carried out by the cut valve 54.

In case of this constitution, the controller 57 selects the cut valve control pilot pressure pattern shown in FIG. 6 according to the engine rotational frequency detected by the rotational frequency sensor 43 and control the cut valve 54 in accordance with the selected pattern, but since a throttle is not provided on the bleed off passage of the control valve for swing (a control valve connected to a specific actuator) 58, the control of the bleed off flow rate is to be carried out by the single operation of the cut valve 54.

If an arrangement is made such that the bleed off flow rate is controlled by the single operation of the cut valve 54 as described above, there provides an advantage that the circuit constitution and control are simple.

Figure 9:
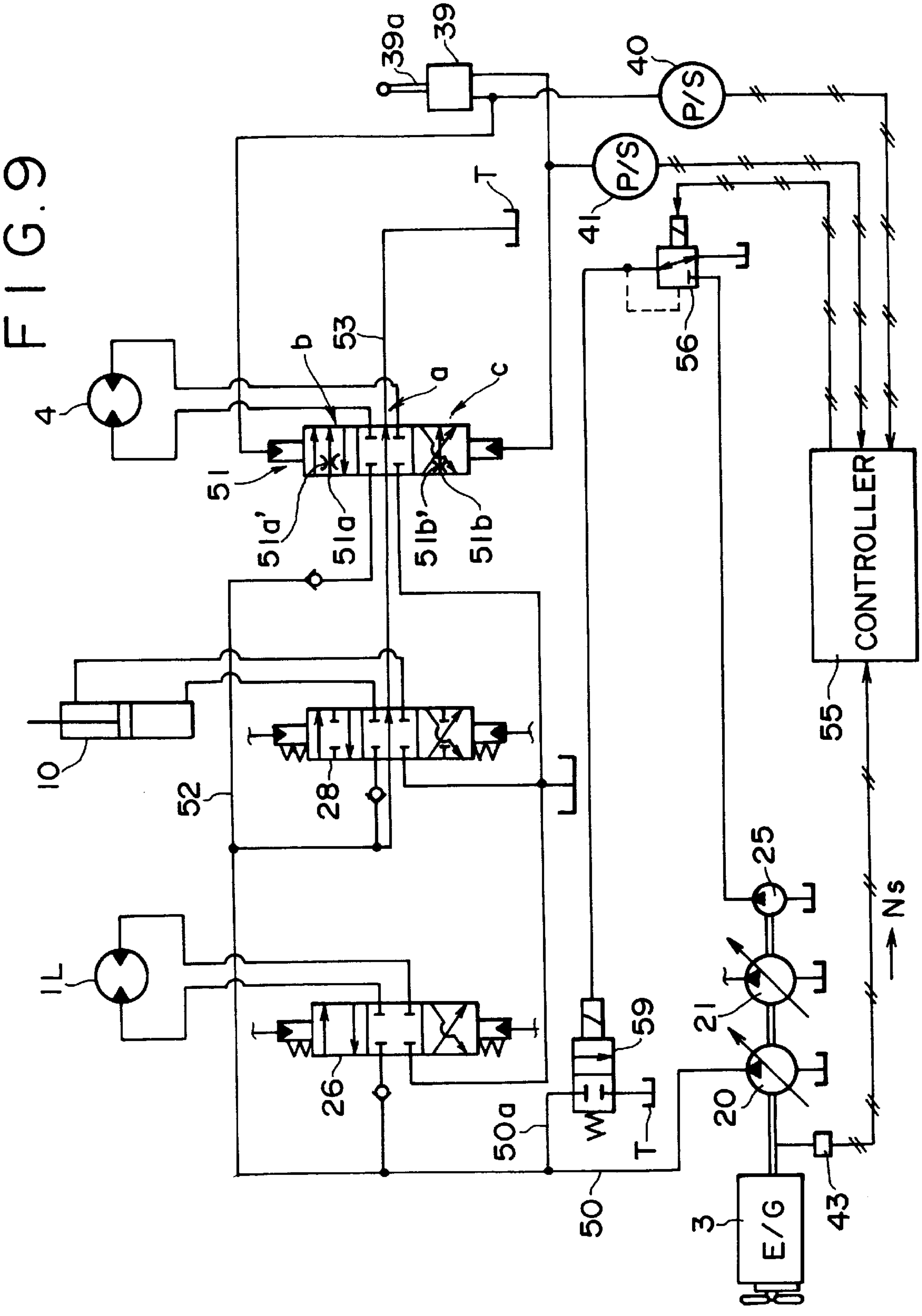
FIG. 9 is a main part hydraulic circuit showing a fourth embodiment of a hydraulic control apparatus according to the present invention.
Figure 10:
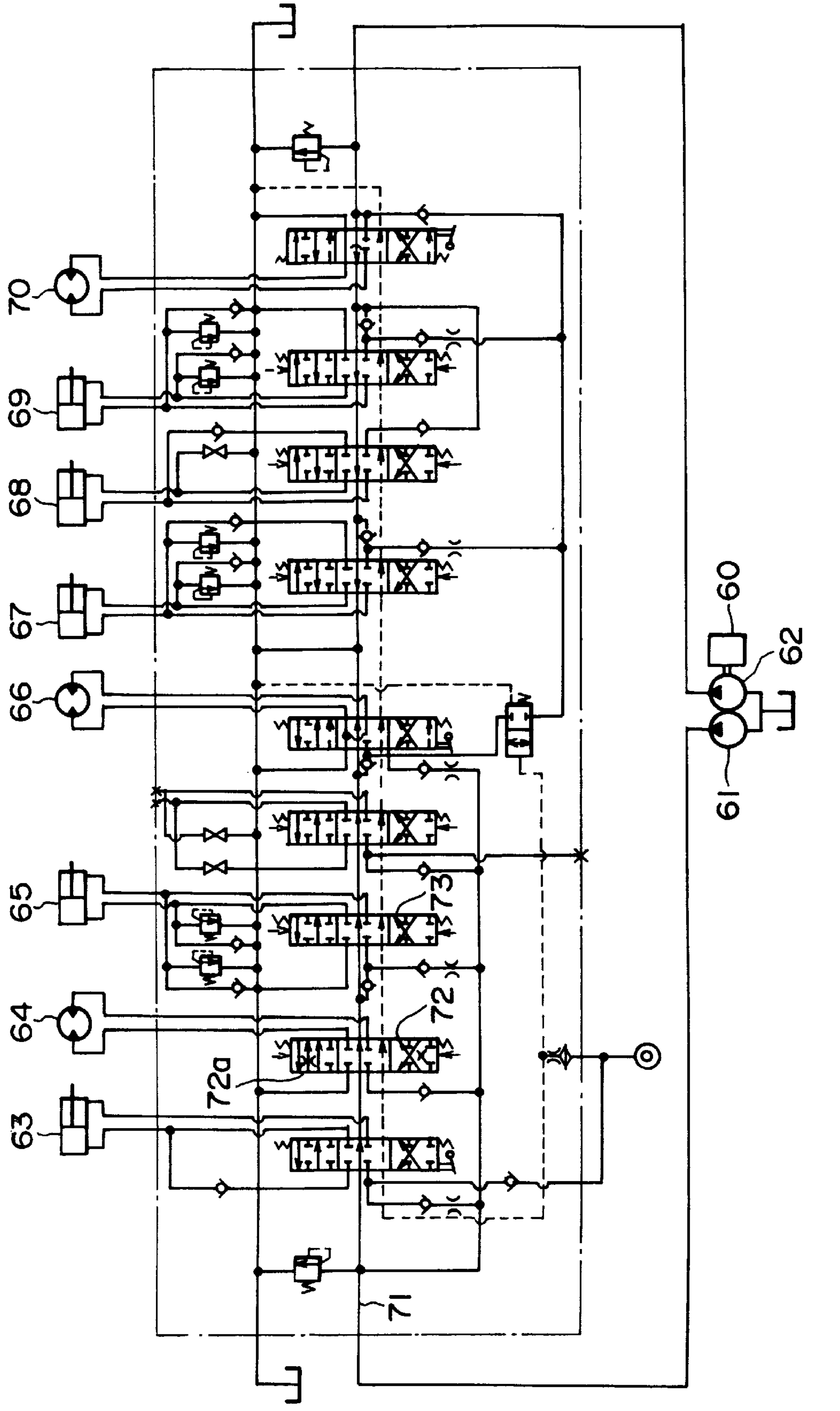
PRIOR ART FIG. 10
FIG. 10 is a hydraulic circuit view showing a constitution of a conventional hydraulic control apparatus.

Now, FIG. 9 shows a fourth embodiment of the hydraulic control device according to the present invention.

In the constitution shown in FIG. 9, the flowpassage 50 for supplying pressure oil to the control valve from the first hydraulic pump 20 is provided with a branch path 50*a,* which is brought into communication with the tank T, and the branch path 50*a* is provided with an unload valve (a pilot switching valve) 59 so that an opening area of the unload valve 59 is adjusted through the solenoid proportional valve 56. In this circuit constitution, the control valve for swing 51 performs the fundamentally same operation as in the second embodiment shown in FIG. 5, and when the engine rotational frequency lowers, the unload valve 59 is controlled in a closing direction to reduce the bleed off flow rate. It is noted that the unload valve 59 and the solenoid proportional valve 56 function as bleed off amount adjusting means.

In the second to fourth embodiments, the bleed off amount adjusting means can be also constituted by an solenoid switching valve for opening and closing the bleed off pipeline 53. In this case, the controller 55 (or 60) detects that the engine rotational frequency Ns lowers than a predetermined value, and controls so that when the operating lever 39*a* is subjected to full lever operation, the solenoid switching valve is controlled to be closed to suppress the bleed off flow rate.

While in the above-described embodiments, the operating amount of the operating lever 39*a* is detected as pressure by the pressure sensors 40 and 41, it is to be noted, not limiting thereto, that for example, a potentiometer or the like can be used to electrically detect the operating amount of the operating lever 39*a.*

Further, while in the above-described embodiments, while the rotational frequency detecting means of the present invention is constituted by the rotational frequency sensor 43, it is to be noted, not limiting thereto, that the engine rotational frequency can be also indirectly detected on the basis of the control element substantially proportional to the engine rotational frequency from the operating amount of the throttle lever (an accelerator lever) detected by a potentiometer, or instructions value to a stepping motor for controlling an engine governor lever (a fuel supply control lever to the engine).

Further, the cut valve control characteristic for short circuit passage shown in FIG. 4 can be also applied to the aforementioned second to fourth embodiments.

What is claimed is:

1. A hydraulic control device for a working machine comprising:

a hydraulic pump driven by a power source;

actuators operated by pressure oil discharged from the hydraulic pump, said actuators including a swing motor;

a control valve for controlling a flow rate and a direction of the pressure oil discharged from the hydraulic pump;

an operating member for switching and operating the control valve;

a bleed-off oil path for bleeding off a part of the pressure oil supplied to said swing motor;

a bleed-off amount adjusting means for adjusting a bleed-off amount provided in the bleed-off oil path;

an operating amount detecting means for detecting an operating amount of the operating member; and a control means for setting the bleed-off amount according to the operating amount detected by the operating amount detecting means and controlling the bleed-off amount adjusting means according to the bleed-off amount set.

2. The hydraulic control device according to claim 1, wherein said bleed-off oil path is constituted by a bypass oil path for communication between an upstream side of an oil path and a downstream side of an oil path of the control valve connected to the swing motor.

3. The hydraulic control device according to claim 1, wherein said control valve connected to the specific actuator is formed with a meter-in passage, a meter-out passage, and said bleed-off oil path.

4. The hydraulic control device for a working machine according to claim 1, wherein said bleed-off oil path is constituted by a branch path branched from an oil path which connects the hydraulic pump and the control valve connected the swing motor.

5. The hydraulic control device for a working machine according to claim 1, wherein said bleed-off amount adjusting means is constituted by a pilot switching valve for opening and closing the bleed-off oil path, and a solenoid proportional valve for exerting a pilot pressure on the pilot switching valve according to the bleed-off amount set.

6. The hydraulic control device according to claim 1, wherein said control valve is a control valve for swing.

7. The hydraulic control device according to claim 2, wherein said control valve connected to the swing motor has a center bypass which is closed at the time of switching operation, and said control means switches said bypass oil path from a full open position to a full closed position with a delay for a predetermined time when switching operation is carried out.

8. The hydraulic control device according to claim 7, wherein said control means is designed so that when the operating amount of the operating member exceeds a first set operating amount, the bypass oil path is gradually closed with delay of time, and when the operating amount of the operating member becomes lower than a second set operating amount, the closed bypass oil path is opened.

9. The hydraulic control device according to claim 1, further comprising a rotational frequency detection means for detecting rotational frequency of said power source, wherein said control means controls so that when the detected value of the rotational frequency detecting means becomes lower than a predetermined rotational frequency, the bleed-off oil path is closed.

10. The hydraulic control device according to claim 9, wherein said control means selects a higher degree between the bleed-off amount based on the operating amount detected by the operating amount detecting means and the bleed-off amount based on the rotational frequency detected by the rotational frequency detecting means and, controls the bleed-off amount adjusting means with the selected bleed-off amount.

11. The hydraulic control device according to claim 9, wherein said control means controls said bleed-off amount adjusting means so that as the rotational frequency of the power source is reduced, the bleed-off amount is reduced.

* * * * *